United States Patent
Gauss et al.

(10) Patent No.: US 11,487,784 B2
(45) Date of Patent: Nov. 1, 2022

(54) RELOAD PROCEDURE TO RETAIN DATA IN TARGET SYSTEM

(71) Applicant: SAP SE, Walldorf (DE)

(72) Inventors: Dennis Alexander Gauss, Bruchsal (DE); Michael Haberkorn, Bad Schoenborn (DE); Sebastian Haase, Kronau (DE)

(73) Assignee: SAP SE, Walldorf (DE)

( * ) Notice: Subject to any disclaimer, the term of this patent is extended or adjusted under 35 U.S.C. 154(b) by 64 days.

(21) Appl. No.: 16/851,271

(22) Filed: Apr. 17, 2020

(65) Prior Publication Data

US 2021/0326351 A1    Oct. 21, 2021

(51) Int. Cl.
| | |
|---|---|
| *G06F 16/27* | (2019.01) |
| *G06F 16/23* | (2019.01) |
| *G06F 16/22* | (2019.01) |
| *G06F 16/21* | (2019.01) |

(52) U.S. Cl.
CPC .......... *G06F 16/27* (2019.01); *G06F 16/219* (2019.01); *G06F 16/2282* (2019.01); *G06F 16/2358* (2019.01)

(58) Field of Classification Search
CPC ............................. G06F 16/27; G06F 16/219
USPC ........................................................ 707/634
See application file for complete search history.

(56) References Cited

U.S. PATENT DOCUMENTS

| | | | | |
|---|---|---|---|---|
| 2007/0274154 | A1* | 11/2007 | Simon ................... | G06F 16/254 367/38 |
| 2009/0292745 | A1* | 11/2009 | Bose ....................... | G06F 16/27 |
| 2010/0145910 | A1* | 6/2010 | Zhao ..................... | G06F 16/178 707/E17.005 |
| 2013/0173547 | A1* | 7/2013 | Cline .................... | G06F 16/178 707/638 |
| 2013/0238556 | A1* | 9/2013 | Mielenhausen ......... | G06F 16/27 707/624 |
| 2017/0286475 | A1* | 10/2017 | Cadarette ............ | G06F 16/2365 |

* cited by examiner

*Primary Examiner* — Muluemebet Gurmu
(74) *Attorney, Agent, or Firm* — Buckley, Maschoff & Talwalkar LLC

(57) ABSTRACT

Systems and methods include creation of a first target table in a target system, the first target table having a structure of a first source table and loaded with data of the first source table, creation of a view in the target system, the view having a name of the first source table and configured to select from the first target table, reception of a request to reload a current version of the first source table into the target system, and, in response to the request, creation of a second target table in the target system, the second target table having a structure of the current version of the first source table, copying of data of the current version of the first source table to the second target table while the view is configured to select from the first target table, and, after copying of the data of the current version of the first source table to the second target table is complete, modification of the view to select from the second target table.

17 Claims, 9 Drawing Sheets

| BG_TAB_MAP ||||||
|---|---|---|---|---|---|
| MT_ID | OBJNAME | TARGET_ID1 | TARGET_ID2 | ACTIVE_TRG_VIEW | ACTIVE_TRG_RELOAD |
| 02A | TABLE A | 0061 | 0062 | 1 | 1 |

| BG_TAB_MAP ||||||
|---|---|---|---|---|---|
| MT_ID | OBJNAME | TARGET_ID1 | TARGET_ID2 | ACTIVE_TRG_VIEW | ACTIVE_TRG_RELOAD |
| 02A | TABLE A | 0061 | 0062 | 1 | 2 |

| BG_TAB_MAP | | | | | |
|---|---|---|---|---|---|
| MT_ID | OBJNAME | TARGET_ID1 | TARGET_ID2 | ACTIVE_TRG_VIEW | ACTIVE_TRG_RELOAD |
| 02A | TABLE A | 0061 | 0062 | 2 | 2 |

RELOAD PROCEDURE TO RETAIN DATA IN TARGET SYSTEM

BACKGROUND

Conventional database systems store large volumes of data related to many aspects of an enterprise. It is often desirable to mirror a portion of the data stored in one system (i.e., a source system) within another system (i.e., a target system). For example, it may be desirable to mirror a portion of data stored in a source system which is particularly suited for data acquisition and storage within a target system which is particularly suited for data analysis.

A replication server may be used to create and update a target table in a target system which mirrors a source table in a source system. Such a replication server may reactively apply changes in the source table to the target table. A user of the target system may utilize the data of the target table while such replication is active.

In response to some events, such as a change to the structure of the source table, it may be necessary to reload all the data of the source table into the target system. The reloading process includes deletion of the prior target table and transfer of all the source table data to the target system. The data of the source table is unavailable in the target system until the transfer is complete. This unavailability, which may consume multiple days in the case of large application tables, may negatively impact related operations.

Efficient systems for reloading replicated database tables into a target system are desired.

DETAILED DESCRIPTION

The following description is provided to enable any person in the art to make and use the described embodiments. Various modifications, however, will remain readily-apparent to those in the art.

According to some embodiments, a source table is replicated in a target system by providing a database view in the target system. The name of the database view is the name of the source table and the database view selects all fields of the source table. A first target table is created in the target system and the database view is configured to select from the first target table. All of the data of the source table is initially loaded into the first target table. Accordingly, a user of the target system may access the database view in order to access the data of the source table (i.e., as stored in the target table).

At reload, a second target table is created in the target system which shares the then-current structure of the source table. All of the current data of the source table is transferred to the second target table, while the database view continues to point to the first target table of the target system. Accordingly, a user of the target system may continue to access the data of the first target table via the database view during load of the source table data into the second target table.

Once all the data is transferred, and perhaps pending user confirmation, the definition of the database view is changed to select from the second target table and the first target table is deleted. Subsequent user access to the database view therefore results in access to data of the second target table. Some embodiments thereby provide access to the previously-transferred data while a reload of the source table data into the new target table occurs in parallel.

Figure 1:
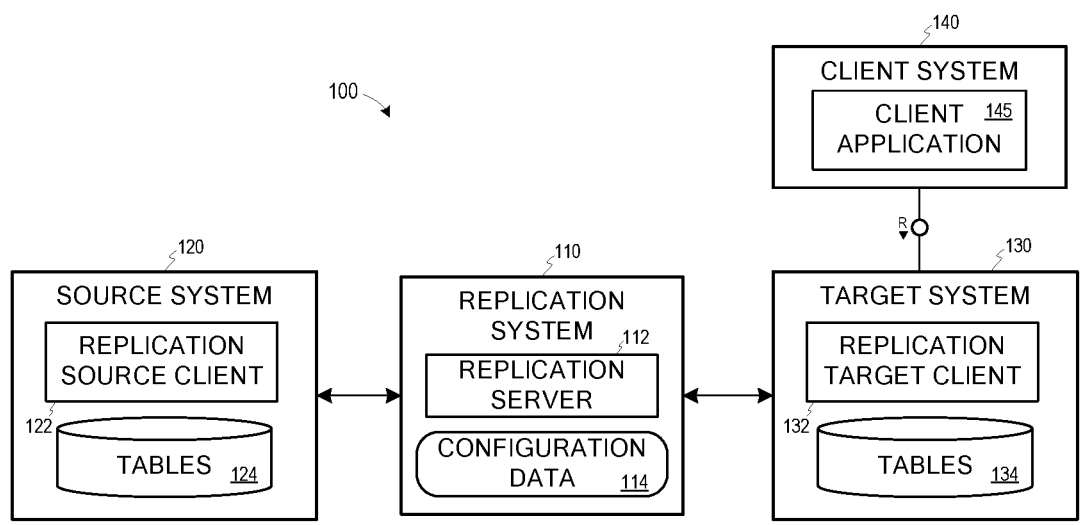
FIG. 1 is a replication architecture according to some embodiments.

FIG. 1 illustrates architecture 100 according to some embodiments. Architecture 100 includes replication system 110 for replicating data from source system 120 into target system 130. Generally, replication system 110 may execute replication server 112 based on configuration data 114 to maintain a replica of one or more tables 124 of source system 120 in tables 134 of target system 130. A record of configuration data 114 may specify particular objects, or tables, of a particular source system to be replicated in one or more particular target systems. Accordingly, although FIG. 1 illustrates only one source system and one target system, in some embodiments replication system 110 may replicate data from one or more source systems to one or more target systems. Configuration data 114 may further indicate additional object-specific parameters which govern replication of the objects.

Each of source system 120 and target system 130 may comprise any computing system capable of executing a database management system, of storing and independently managing data of one or more tenants and, in some embodiments, of supporting the execution of database server applications. Each of source system 120 and target system 130 may include a distributed storage system and/or distributed server nodes for performing computing operations as is known in the art. According to some embodiments, source system 120 is a data warehousing system and target system 130 is an in-memory database system configured to provide data analytics, but embodiments are not limited thereto.

Source system 120 may execute replication source client 122 to record changes to configuration-specified ones of tables 124 and provide the changes to replication server 112. Replication server 112 may then provide appropriate changes to appropriate ones of tables 134 via replication target client 132.

Client device system 140 executes client application 145 to communicate with target system 130. Client application 145 may comprise code executing within a Web browser executed by client system 140 according to some embodiments. Client application 145 may communicate with one or more server applications (not shown) executing on target system 130 to perform data analytics on data stored in tables 134. As described herein, such data may be accessed via database views named according to the source table of tables 124 from which the data was replicated.

The data stored within tables 124 and tables 134 may comprise one or more of conventional tabular data, row-based data, column-based data, and object-based data. According to some embodiments, replication server 112 operates to perform any transformations necessary to convert data from a format of tables 124 to a format of tables 134. The data may be distributed among several relational databases, dimensional databases, and/or other data sources.

Source system 120 or target system 130 may implement an in-memory database, in which a full database is stored in volatile (e.g., non-disk-based) memory (e.g., Random Access Memory). The full database may be persisted in and/or backed up to fixed disks (not shown). Embodiments are not limited to in-memory implementations. For example, source system 120 or target system 130 may store data in Random Access Memory (e.g., cache memory for storing recently-used data) and one or more fixed disks (e.g., persistent memory for storing their respective portions of the full database).

Figure 2:
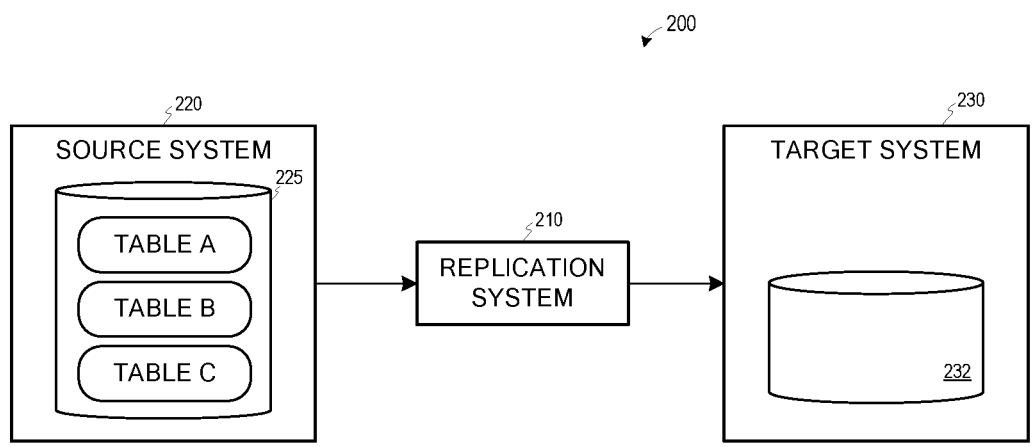
FIG. 2 is a replication architecture for illustrating an initial load according to some embodiments.

FIG. 2 illustrates system 200 according to some embodiments. Replication system 210 operates to replicate data from source system 220 into target system 230. System 200 may be implemented by architecture 100 but embodiments are not limited thereto.

FIG. 2 illustrates system 200 prior to an initial load of table data into storage 232 of target system 230. Storage 225 of source system 220 includes three tables. It will be assumed that configuration information stored in replication system 210 indicates that Table A of source system 220 is to be replicated in target system 230.

Figure 3A:
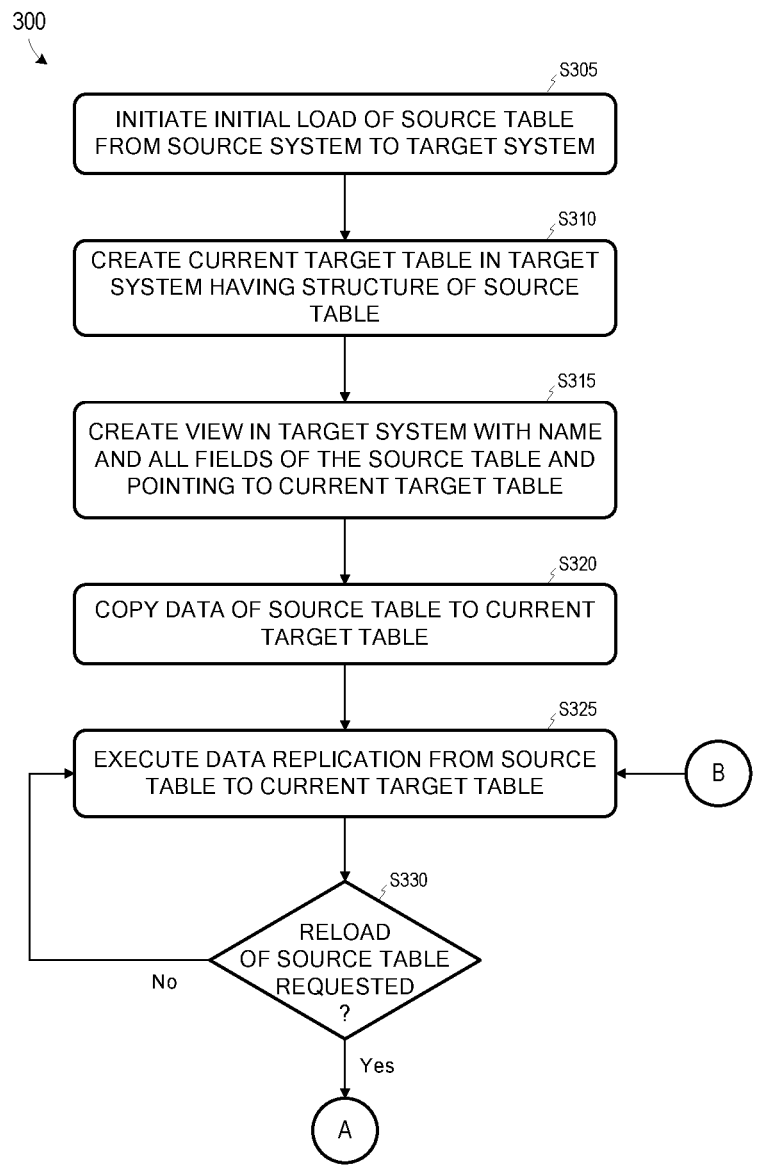
FIGS. 3a and 3b comprise a flow diagram of a process to load a table from a source system into a target system and to reload the table from the source system into the target system according to some embodiments.
Figure 3B:
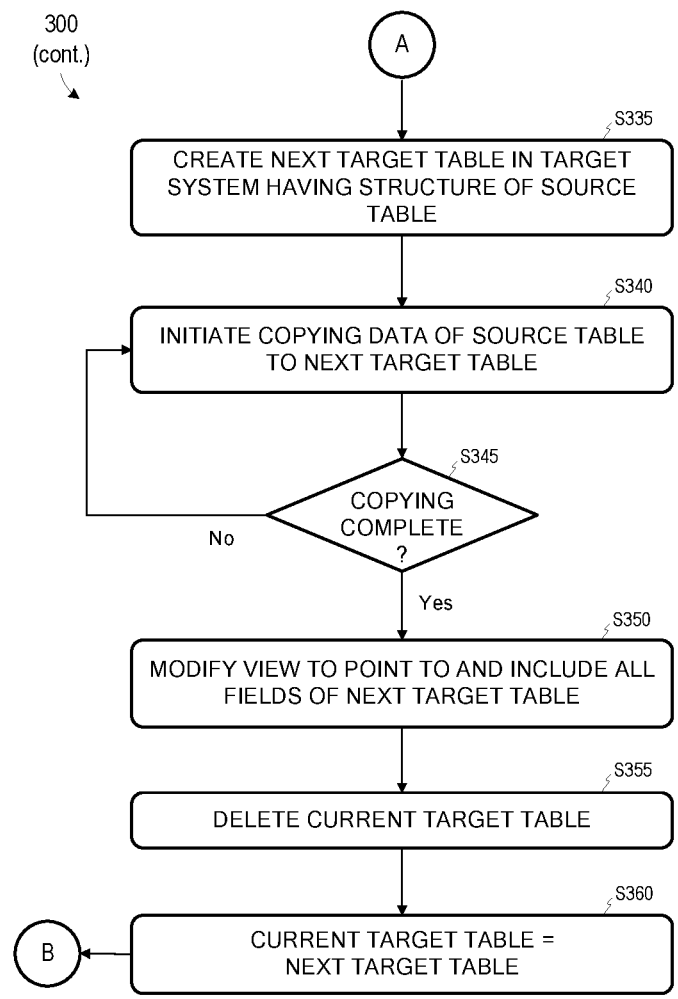

FIGS. 3a and 3b comprise a flow diagram of process 300 to load and reload table data from a source system to a target system according to some embodiments. Process 300 will be described with respect to the example of FIG. 2 but embodiments are not limited thereto.

Process 300 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

At S305, an initial load of a source table from a source system to a target system is initiated. The initial load may be initiated by replication server 210 based on the above-described configuration information specifying source system 220, target system 230 and Table A.

A target table is created in the target system at S310 in response to the initiated initial load. The target table will be referred to as the "current" target table, and is created with the same structure as the source table. A view is also created in the target system at S315. The view is named according to the source table (e.g., "Table A") and selects all the fields of the source table. Moreover, the view points to (i.e., selects from) the current target table created at S310.

Figures 4, 5:
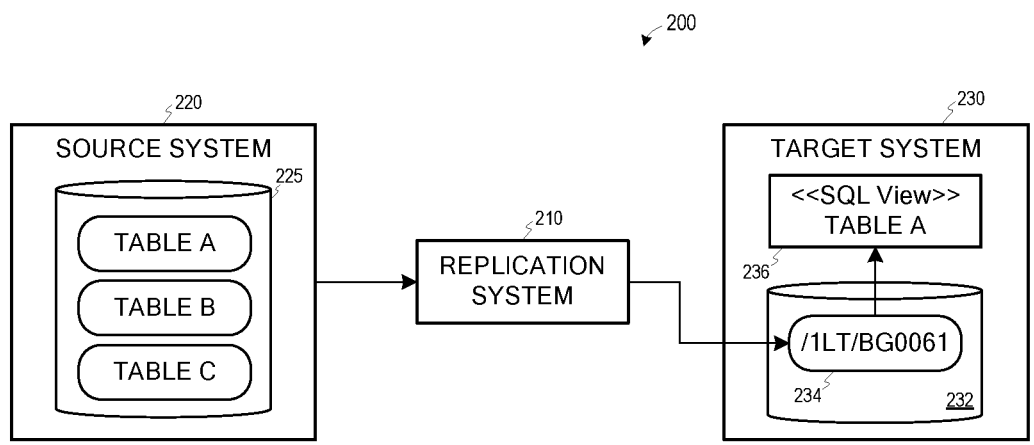
FIG. 4 is a replication architecture for illustrating an initial load according to some embodiments.
FIG. 5 illustrates configuration metadata specifying a current consumption table and a current reload table according to some embodiments.

FIG. 4 illustrates system 200 after S315 according to some embodiments. Specifically, table 234, named "1LT/BG0061" is created in storage 232 and shares the structure of Table A of storage 225. View 236 is named "Table A" and points to table 234. FIG. 5 shows record 500 of configuration information stored in replication system 210, which indicates the name of the replicated object, an identifier of the current target table, an identifier of another target table, and identifier of the target table selected by the view (i.e., "1"=Target_ID1="0061") and an identifier of the target table into which source data is to be loaded (i.e., "1"=Target_ID1="0061").

Figure 6:
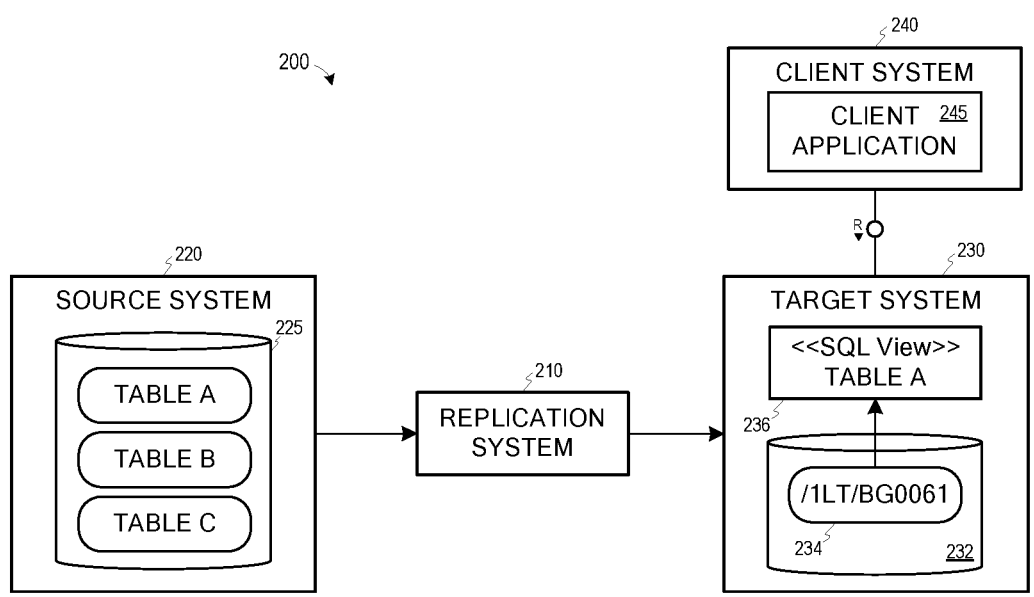
FIG. 6 is a replication architecture for illustrating completion of an initial load according to some embodiments.

Next, at S320, the data of the source table is copied into the current target table (i.e., ACTIVE_TRG_RELOAD). Replication server 210 may perform and necessary transformations on the data prior to transferring the data to target system 230. FIG. 6 illustrates system 200 after copying of the data of Table A into table 234. As shown, client system 240 may execute client application 245 to access the copied data within target table 234 via view 236. Client application 245 may be unaware of the existence of view 236, or of the name of table 234, and may simply operate to access "Table A".

Data replication is executed at S325 as is known in the art to replicate data from source Table A to target table /1LT/BG0061 specified in record 500. Such replication may include the execution of database triggers within source system 220 to identify changes to Table A and communication of the identified changes to replication server 210. Replication continues at S325 until a reload of the source table is requested at S330. During such replication, client application 245 may continue to access target table 234 via view 236.

Reload of the source table 330 may be requested in response to any suitable event. For example, a change to the structure of source Table A may cause source system 220 to request reload of source Table A. In another scenario, a database trigger associated with source Table A may fail, thereby requiring a reload of Table A to ensure that the copy of Table A in target system 230 is accurate.

Figures 7, 8:
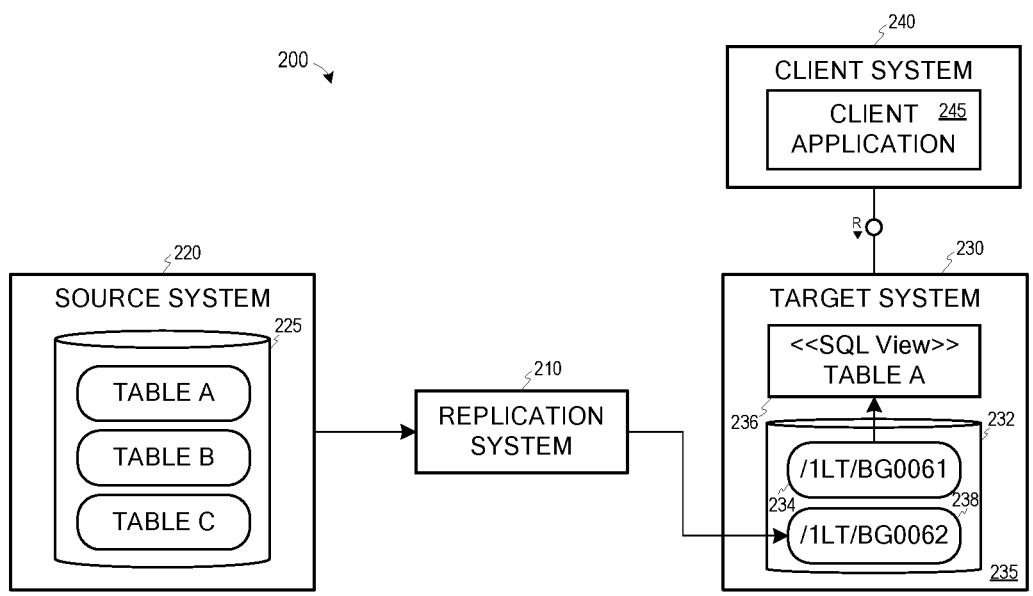
FIG. 7 illustrates configuration metadata specifying a current consumption table and a new reload table according to some embodiments.
FIG. 8 is a replication architecture for illustrating reload of a source table according to some embodiments.

Flow proceeds to S335 in response to a reload request. At S335, a next target table is created in the target system. The next target table has the same structure as the now-current source table. Copying of the full data of the source table to the next target table is initiated at S340. As shown in FIG. 7, record 500 is updated prior to S340 to indicate that the next target table (i.e., TARGET_ID2) is the reload table for receiving reloaded and replicated data.

FIG. 8 illustrates system 200 after S340 according to some embodiments. Next target table 238, named /1LT/BG0062 per record 500, has been created in storage 232 and replication system 210 copies data from source Table A into next target table 238. As the data is copied, client application 245 may continue to access the data of table 234, via view 236. Accordingly, the reloading of the data of source Table A into target system 230 does not prevent access to the prior version of Table A stored in table 234.

Figures 9, 10:
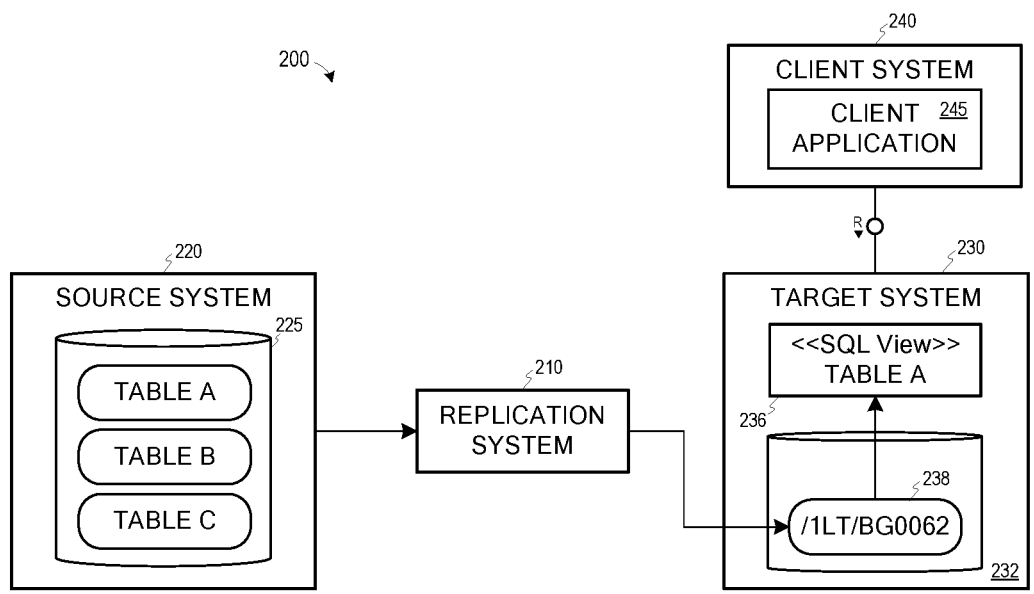
FIG. 9 is a replication architecture for illustrating completion of a reload of a source table according to some embodiments.
FIG. 10 illustrates configuration metadata specifying a new consumption table and a new reload table according to some embodiments.

Flow proceeds from S345 to S350 once it is determined that the copying is complete. The view is modified to point to the next target table at S350 and, at S355, the current target table is deleted. FIG. 9 shows system 200 after modification of view 236 and deletion of table 234. As shown, view 236 points to table 238 and therefore the reloaded data of table 238 is now accessed when client application 245 accesses view 236.

The next target table is assigned as the current reload/replication table at 360. As shown in record 500 of FIG. 10, table 238 (i.e., TARGET_ID2) is now the ACTIVE_TRG_VIEW table as well as the reload/replication target table. Flow then returns to S325 to resume replication of source Table A within table 238. Upon receiving a subsequent reload request, flow proceeds as described above to create a new table (i.e., /1LT/BG0061) in target system 230, reload source Table A into that table while view 236 continues to point to target table 238, delete target table 238 after reload is complete, and modify view 238 to point to the new table.

Figure 11:
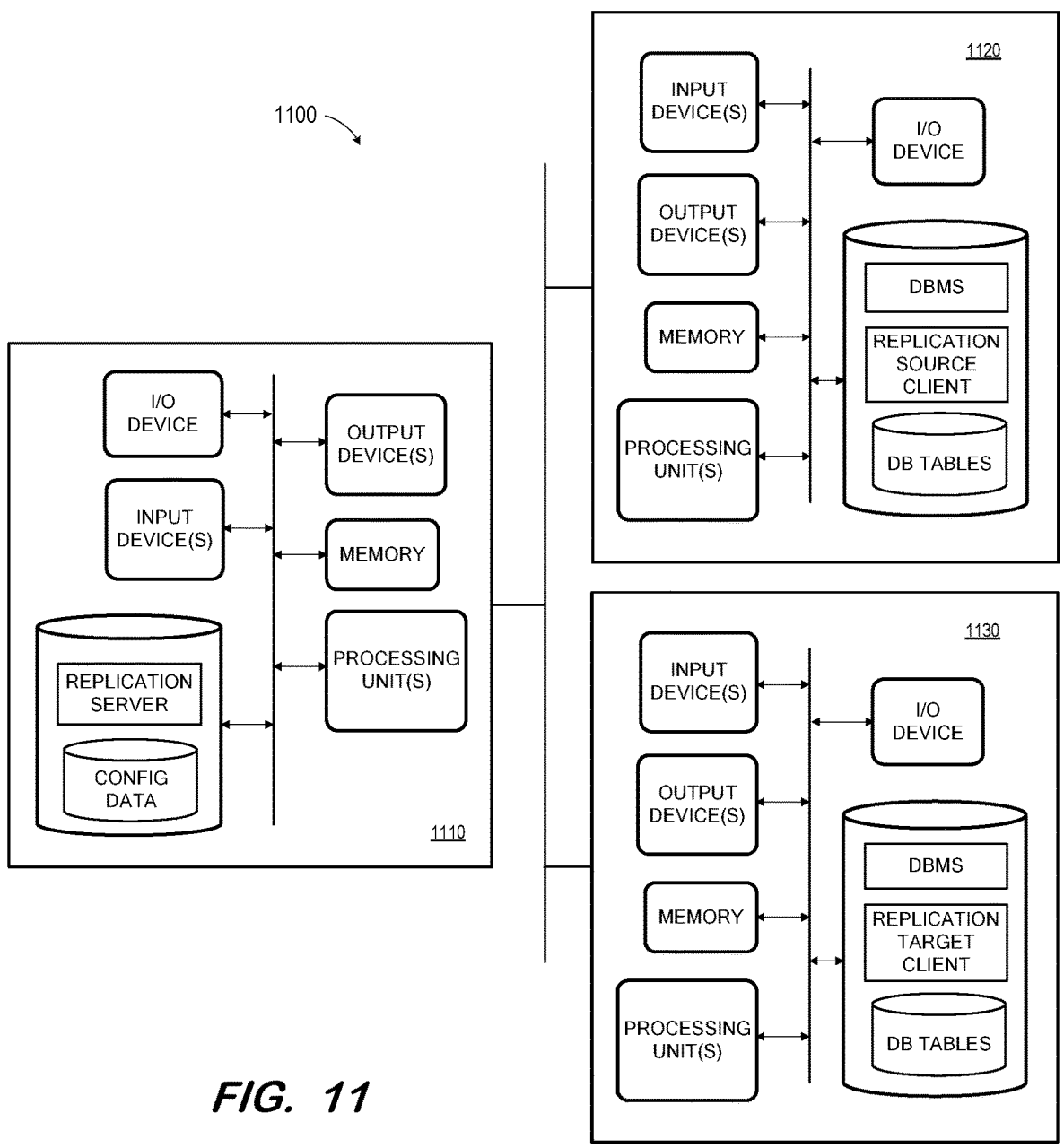
FIG. 11 is a block diagram of computing devices comprising a replication architecture for according to some embodiments.

FIG. 11 is a block diagram of system 1100 according to some embodiments. System 1100 includes replication system 1110, which may comprise an implementation of replication system 110 or 210. Similarly, source system 1120 may comprise an implementation of source system 120 or 220 and target system 1130 may comprise an implementation of target system 130 or 230. According to some embodiments, replication system 1110 may communicate simultaneously with many source systems and target systems to perform replication and reload of objects as specified by configuration information. Each of systems 1110, 1120 and 1130 may comprise a general-purpose computing apparatus and may execute program code using processing unit(s) to perform any of the functions described herein. Each of systems 1110, 1120 and 1130 may include other unshown elements according to some embodiments.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps;
a processing unit to execute the processor-executable process steps to cause the system to:
create a first target table in a target system, the first target table having a structure of a first source table and loaded with data of the first source table;
create a view in the target system, the view having a name of the first source table and pointing to the first target table;
receive a request to reload a current version of the first source table into the target system;
in response to the request,
create a second target table in the target system, the second target table having a structure of the current version of the first source table;
copy data of the current version of the first source table to the second target table while the view points to the first target table; and
after copying of the data of the current version of the first source table to the second target table is complete, modify the view to point to the second target table;
create a third target table in the target system, the third target table having a structure of a second source table and loaded with data of the second source table;
create a second view in the target system, the second view having a name of the second source table and pointing to the third target table;
receive a second request to reload a current version of the second source table into the target system; and
in response to the second request,
create a fourth target table in the target system, the fourth target table having a structure of the current version of the second source table;
copy data of the current version of the second source table to the fourth target table while the view points to the third target table; and
after copying of the data of the current version of the second source table to the fourth target table is complete, modify the view to point to the fourth target table.

2. A system according to claim 1, the processing unit to execute the processor-executable process steps to cause the system to:
after modification of the view to point to the second target table, deleting the first target table from the target system.

3. A system according to claim 1, the processing unit to execute the processor-executable process steps to cause the system to:
before receipt of the request to reload the current version of the first source table into the target system, replicating data of the first source table into the first target table.

4. A system according to claim 3, the processing unit to execute the processor-executable process steps to cause the system to:
after modification of the view to point to the second target table, replicating data of the current version of first source table into the second target table.

5. A system according to claim 1, the processing unit to execute the processor-executable process steps to cause the system to:
after modification of the view to point to the second target table, deleting the first target table from the target system; and
after modification of the second view to point to the fourth target table, deleting the third target table from the target system.

6. A system according to claim 5, the processing unit to execute the processor-executable process steps to cause the system to:

before receipt of the request to reload the current version of the first source table into the target system, replicating data of the first source table into the first target table;
after modification of the view to point to the second target table, replicating data of the current version of first source table into the second target table;
before receipt of the request to reload the current version of the second source table into the target system, replicating data of the second source table into the third target table; and
after modification of the view to point to the fourth target table, replicating data of the current version of second source table into the fourth target table.

7. A computer-implemented method comprising:
loading a first target table in a target system with data of a first source table of a source system;
creating a view in the target system, the view having a name of the first source table and pointing to the first target table;
receiving a request to reload a current version of the first source table into the target system;
in response to the request,
creating a second target table in the target system, the second target table having a structure of the current version of the first source table;
copying data of the current version of the first source table to the second target table while the view points to the first target table; and
after copying of the data of the current version of the first source table to the second target table is complete, modifying the view to point to the second target table;
loading a third target table in the target system with data of a second source table of the source system;
creating a second view in the target system, the second view having a name of the second source table and pointing to the third target table;
receiving a second request to reload a current version of the second source table into the target system; and
in response to the second request,
creating a fourth target table in the target system, the fourth target table having a structure of the current version of the second source table;
copying data of the current version of the second source table to the fourth target table while the view points to the third target table; and
after copying of the data of the current version of the second source table to the fourth target table is complete, modifying the view to point to the fourth target table.

8. A method according to claim 7, further comprising:
after modifying the view to point to the second target table, deleting the first target table from the target system.

9. A method according to claim 7, further comprising:
before receiving the request to reload the current version of the first source table into the target system, replicating data of the first source table into the first target table.

10. A method according to claim 9, further comprising:
after modifying the view to point to the second target table, replicating data of the current version of first source table into the second target table.

11. A method according to claim 7, further comprising:
after modifying the view to point to the second target table, deleting the first target table from the target system; and
after modifying the second view to point to the fourth target table, deleting the third target table from the target system.

12. A method according to claim 11, further comprising:
before receiving the request to reload the current version of the first source table into the target system, replicating data of the first source table into the first target table;
after modifying the view to point to the second target table, replicating data of the current version of first source table into the second target table;
before receiving the request to reload the current version of the second source table into the target system, replicating data of the second source table into the third target table; and
after modifying the view to point to the fourth target table, replicating data of the current version of second source table into the fourth target table.

13. A system comprising:
a source database system storing a first source database table;
a target database system;
a replication system to:
instruct the target database system to create a first target database table, the first target database table having a structure of the first source database table;
load data of the first source database table into the first target database table;
instruct the target database system to create a view, the view having a name of the first source database table and pointing to the first target database table;
receive a request to reload a current version of the first source database table into the target database system;
in response to the request,
instruct the target database system to create a second target database table, the second target database table having a structure of the current version of the first source database table;
copy data of the current version of the first source database table to the second target database table while the view points to the first target database table; and
after copying of the data of the current version of the first source database table to the second target database table is complete, instruct the target database system to modify the view to point to the second target table;
instruct the target database system to create a third target database table, the third target database table having a structure of a second source database table of the source database system;
load data of the second source database table into the third target database table;
instruct the target database system to create a second view, the second view having a name of the second source database table and pointing to the third target database table;
receive a second request to reload a current version of the second source database table into the target database system; and
in response to the second request,
instruct the target database system to create a fourth target database table, the fourth target database table having a structure of the current version of the second source database table;

copy data of the current version of the second source database table to the fourth target database table while the second view points to the third target database table; and after copying of the data of the current version of the second source database table to the fourth target database table is complete, instruct the target database system to modify the view to point to the fourth target database table.

14. A system according to claim 13, the replication system to:

after the view is modified to point to the second target database table, instruct the target database system to delete the first target database table.

15. A system according to claim 13, the replication system to:

before receipt of the request to reload the current version of the first source database table into the target database system, replicating data of the first source database table into the first target database table.

16. A system according to claim 15, the replication system to:

after the view is modified to point to the second target database table, replicate data of the current version of first source database table into the second target database table.

17. A system according to claim 13, the replication system to:

before receipt of the request to reload the current version of the first source database table into the target database system, replicate data of the first source database table into the first target database table;

after modification of the view to point to the second target database table, replicate data of the current version of first source database table into the second target database table;

before receipt of the request to reload the current version of the second source database table into the target database system, replicate data of the second source database table into the third target database table; and after modification of the view to point to the fourth target database table, replicate data of the current version of second source database table into the fourth target database table.

* * * * *